United States Patent Office 3,282,954
Patented Nov. 1, 1966

3,282,954
SUBSTITUTED PYRAZOLYLTHIOACETIC ACIDS AND ESTERS THEREOF
Robert G. Stein and Hollis G. Schoepke, Waukegan, Ill., assignors to Abbott Laboratories, Chicago, Ill., a corporation of Illinois
No Drawing. Filed Aug. 7, 1964, Ser. No. 388,270
18 Claims. (Cl. 260—310)

This invention relates to novel compounds of the formulas

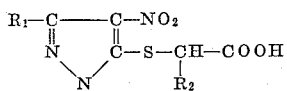

(A)

and

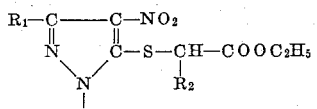

(B)

and a method for their preparation. In these and succeeding formulas, R, $R_1$ and $R_2$ represent hydrogen, loweralkyl with from 1 to 4 carbon atoms, phenyl, halophenyl, loweralkylphenyl or loweralkoxyphenyl. These compounds are useful as trichomonacides and will completely inhibit the growth of *Trichomonas vaginalis* at concentrations of 100 parts per million of water when employed as aqueous solutions or suspensions.

The pyrazolylthioacetic acids of Formula A are readily prepared by the reaction of equimolecular proportions of an $R_2$-substituted mercaptoacetic acid and a 1,3-substituted-4-nitro-5-chloropyrazole of the formula

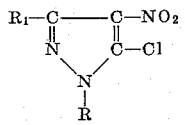

(C)

in the presence of an HCl acceptor such as sodium bicarbonate. The reaction is conveniently carried out by adding an alcoholic solution of the pyrazole to an aqueous solution of the mercapto acetic acid and sodium bicarbonate at room temperature and thereafter refluxing the resulting mixture for a few hours to complete the reaction. The mixture is then poured over ice and acidified to precipitate the desired pyrazolylthioacetic acid which is recrystallized from a suitable organic solvent such as a benzene-petroleum ether mixture.

The corresponding ethyl esters of Formula B are prepared by refluxing the pyrazolylthioacetic acids in ethanol in the presence of a catalytic amount of concentrated sulfuric acid. When the esterification is complete, the solution is concentrated, washed successively with aqueous alkali and water and recrystallized or fractionally distilled to obtain the desired ester as a crystalline solid or mobile liquid.

The following examples set forth the best mode of performing the invention but should not be construed as the sole embodiments thereof.

*Example 1.—α-(1-isopropyl-3-methyl-4-nitro-5-pyrazolyl-thio-acetic acid*

A solution of 28.4 grams (0.14 mole) of 1-isopropyl-3-methyl-4-nitro-5-chloropyrazole in 200 ml. of ethyl alcohol was added dropwise to a solution of 12.9 grams (0.14 mole) of mercapto acetic acid and 23.5 grams (0.28 mole) of sodium bicarbonate in 250 ml. of water at room temperature. The resulting mixture was refluxed for 5 hours and then poured into 800 ml. of ice water. After acidifying with concentrated hydrochloric acid, the solid which precipitated was separated by filtration, washed with water and recrystallized from benzene-petroleum ether to obtain the desired product which melted at 142° C.

*Examples 2–10*

By reacting the appropriate $R_2$-substituted mercapto acetic acid with a 1,3-substituted-5-chloro-4-nitro pyrazole of Formula C in the same manner as that described in Example 1, the following α-(5-pyrazolylthio)acetic acids are obtained wherein R, $R_1$ and $R_2$ of Formula A are as shown in the table below.

| Example No. | R | $R_1$ | $R_2$ | M.P. in ° C. |
|---|---|---|---|---|
| 2 | $CH_3$ | $CH_3$ | H | 143 |
| 3 | $CH_3$ | $CH_3$ | $CH_3$ | 155 |
| 4 | n-Propyl | $CH_3$ | H | 128 |
| 5 | n-Butyl | $CH_3$ | H | 123 |
| 6 | Phenyl | $CH_3$ | H | 145 |
| 7 | $CH_3$ | Isopropyl | H | 85 |
| 8 | H | $CH_3$ | H | 195 |
| 9 | Ethyl | $CH_3$ | H | 135 |
| 10 | $CH_3$ | n-Propyl | H | 137 |

*Example 11.—Ethyl α-(1-isopropyl-3-methyl-4-nitro-5-pyrazolylthio)acetate*

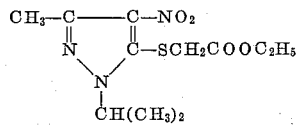

A mixture of 28 grams (0.10 mole) of the compound prepared in Example 1, 300 ml. of ethyl alcohol and 3 ml. of concentrated sulfuric acid was heated at the boiling temperature and under reflux for 5 hours. The resulting solution was concentrated almost to dryness and 100 ml. of benzene was added to the residue. The benzene solution was washed first with a 20% aqueous sodium carbonate solution and then with water. After drying, the solution was again concentrated and the solid residue recrystallized from petroleum ether to obtain the desired acetate compound which melted at 74° C.

*Examples 12–18*

In a manner similar to that described in Example 11 except that the reaction mixture was fractionally distilled instead of recrystallized, other R, $R_1$-substituted-4-nitro-5-pyrazolylmercaptoacetic acids of Formula A were refluxed with ethyl alcohol to obtain the corresponding ethyl esters of Formula B wherein R, $R_1$ and $R_2$ were as indicated in the following table:

| Example No. | R | $R_1$ | $R_2$ | B.P. in ° C. |
|---|---|---|---|---|
| 12 | $CH_3$ | $CH_3$ | H | 187 at 4 mm. |
| 13 | $CH_3$ | $CH_3$ | $CH_3$ | 172 at 2 mm. |
| 14 | n-Propyl | $CH_3$ | H | 157 at 0.4 mm. |
| 15 | $CH_3$ | t-Butyl | H | 152 at 0.8 mm. |
| 16 | Ethyl | $CH_3$ | H | 165 at 1 mm. |
| 17 | $CH_3$ | n-Propyl | $CH_3$ | 159 at 0.5 mm. |
| 18 | $CH_3$ | do | H | 170 at 0.7 mm. |

By employing the procedure set forth in the foregoing examples, other compounds corresponding to Formula A or B can be prepared wherein R, $R_1$ and $R_2$ represent such radicals as p-chlorophenyl, o-bromophenyl, p-methylphenyl, o-butylphenyl, p-methoxyphenyl or o-isopropoxyphenyl and the like.

The 1,3-substituted-4-nitro-5-chloropyrazoles of Formula C employed as one of the starting materials in the present invention are readily prepared by known methods. Thus, a pyrazolinone of the formula

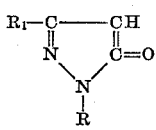

is reacted with $POCl_3$ at a temperature of 100°–150° C. to form the corresponding 5-chloropyrazole of the formula

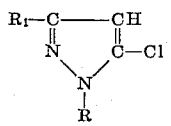

which is then nitrated with fuming nitric acid at from 0° to 25° C. The melting and boiling points of typical pyrazoles of Formula C are shown in the following table.

| R | $R_1$ | M.P. or B.P.* in ° C. |
|---|---|---|
| $CH_3$ | $CH_3$ | 78. |
| $C_2H_5$ | $CH_3$ | 37. |
| Isopropyl | $CH_3$ | 95. |
| Phenyl | $CH_3$ | 115. |
| $CH_3$ | t-Butyl | 38. |
| n-Propyl | $CH_3$ | 148 at 14 mm.* |
| n-Butyl | $CH_3$ | 150 at 11 mm.* |
| $CH_3$ | n-Propyl | 132 at 2 mm.* |
| H | $CH_3$ | 114. |
| $CH_3$ | Ethyl | 38. |
| $CH_3$ | Isopropyl | 48. |

We claim:

1. A compound selected from the group consisting of compounds of the Formula A

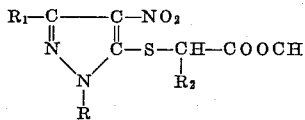

and compounds of the Formula B

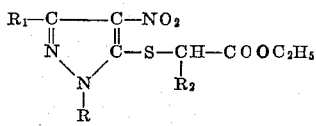

wherein R, $R_1$ and $R_2$ are independently selected from the group consisting of hydrogen, loweralkyl, phenyl, halophenyl, loweralkylphenyl and loweralkoxyphenyl.

2. A compound of Formula A as claimed in claim 1 in which R is isopropyl, $R_1$ is methyl and $R_2$ is hydrogen.
3. A compound of Formula A as claimed in claim 1 in which R and $R_1$ are methyl and $R_2$ is hydrogen.
4. A compound of Formula A as claimed in claim 1 in which R, $R_1$ and $R_2$ are all methyl.
5. A compound of Formula A as claimed in claim 1 in which R is n-propyl, $R_1$ is methyl and $R_2$ is hydrogen.
6. A compound of Formula A as claimed in claim 1 in which R is n-butyl, $R_1$ is methyl and $R_2$ is hydrogen.
7. A compound of Formula A as claimed in claim 1 in which R is phenyl, $R_1$ is methyl and $R_2$ is hydrogen.
8. A compound of Formula A as claimed in claim 1 in which R is methyl, $R_1$ is isopropyl and $R_2$ is hydrogen.
9. A compound of Formula A as claimed in claim 1 in which R and $R_2$ are hydrogen and $R_1$ is methyl.
10. A compound of Formula A as claimed in claim 1 in which R is ethyl, $R_1$ is methyl and $R_2$ is hydrogen.
11. A compound of Formula B as claimed in claim 1 in which R is isopropyl, $R_1$ is methyl and $R_2$ is hydrogen.
12. A compound of Formula B as claimed in claim 1 in which R and $R_1$ are methyl and $R_2$ is hydrogen.
13. A compound of Formula B as claimed in claim 1 in which R, $R_1$ and $R_2$ are all methyl.
14. A compound of Formula B as claimed in claim 1 in which R is n-propyl, $R_1$ is methyl and $R_2$ is hydrogen.
15. A compound of Formula B as claimed in claim 1 in which R is methyl, $R_1$ is t-butyl and $R_2$ is hydrogen.
16. A compound of Formula B as claimed in claim 1 in which R is ethyl, $R_1$ is methyl and $R_2$ is hydrogen.
17. A compound of Formula B as claimed in claim 1 in which R is methyl, $R_1$ is n-propyl and $R_2$ is hydrogen.
18. A compound of Formula B as claimed in claim 1 in which R and $R_2$ are methyl and $R_1$ is n-propyl.

References Cited by the Examiner

UNITED STATES PATENTS 2,615,895  10/1952  Archer _____ 260—294.8
2,977,368   3/1961  Druey et al. _____ 260—294.8

OTHER REFERENCES

Conant et al.: The Chemistry of Organic Compounds, 3d ed., page 91, New York, Macmillan, 1947.

Fisher et al.: Canadian Journal of Chemistry, vol. 39, pages 785–88 (1961).

Noller: Chemistry of Organic Compounds, 2d ed., pages 152 and 168, Philadelphia, Saunders, 1958.

WALTER A. MODANCE, *Primary Examiner.*

N. TROUSOF, *Assistant Examiner.*

UNITED STATES PATENT OFFICE
CERTIFICATE OF CORRECTION

Patent No. 3,282,954            November 1, 1966

Robert G. Stein et al.

It is hereby certified that error appears in the above numbered patent requiring correction and that the said Letters Patent should read as corrected below.

Column 3, lines 36 to 41, the formula should appear as shown below instead of as in the patent:

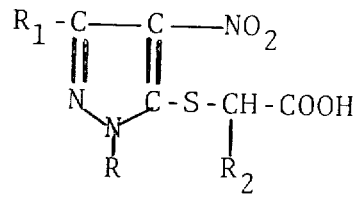

Signed and sealed this 5th day of September 1967.

(SEAL)
Attest:

ERNEST W. SWIDER
Attesting Officer

EDWARD J. BRENNER
                                  Commissioner of Patents